US011572132B2

(12) United States Patent
den Hertog

(10) Patent No.: US 11,572,132 B2
(45) Date of Patent: Feb. 7, 2023

(54) BICYCLE BATTERY ASSEMBLY

(71) Applicant: Trek Bicycle Corporation, Waterloo, WI (US)

(72) Inventor: Reijer den Hertog, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 771 days.

(21) Appl. No.: 16/401,340

(22) Filed: May 2, 2019

(65) Prior Publication Data

US 2019/0337587 A1  Nov. 7, 2019

Related U.S. Application Data

(60) Provisional application No. 62/667,840, filed on May 7, 2018.

(51) Int. Cl.
*B62M 6/90* (2010.01)
*H01M 50/20* (2021.01)
*B62M 6/60* (2010.01)

(52) U.S. Cl.
CPC .............. *B62M 6/90* (2013.01); *H01M 50/20* (2021.01); *B62M 6/60* (2013.01); *H01M 2220/20* (2013.01)

(58) Field of Classification Search
CPC . B62J 43/28; B62J 43/13; B62J 43/23; B62H 5/001; B62K 19/30; B62M 6/60; B62M 6/90; H01M 50/20; H01M 50/262; H01M 50/271; H01M 2220/20; Y02E 60/10
See application file for complete search history.

(56) References Cited

U.S. PATENT DOCUMENTS

| 5,226,501 A | 7/1993 | Takata |
| 5,368,122 A | 11/1994 | Chou |
| 5,370,200 A | 12/1994 | Takata |
| 5,474,148 A | 12/1995 | Takata |
| 5,505,277 A | 4/1996 | Suganuma et al. |

(Continued)

FOREIGN PATENT DOCUMENTS

| CN | 101049847 | 10/2007 |
| CN | 202115671 | 1/2012 |

(Continued)

*Primary Examiner* — Stewart A Fraser
*Assistant Examiner* — Lilia Nedialkova
(74) *Attorney, Agent, or Firm* — Bell & Manning, LLC

(57) ABSTRACT

A bicycle battery system includes a battery assembly and a battery lock. The battery assembly includes a battery and a handle assembly mounted to the battery. The handle assembly includes a handle mount, a handle plunger, and a handle. The battery lock is mounted within a cavity of a frame of a bicycle and configured to secure the battery assembly within the cavity. The battery lock includes a lock plunger, a movable latch, and a stationary latch. The lock plunger is configured to press a portion of the handle mount against the movable latch when the battery lock is in a locked position such that the battery assembly is securely mounted within the cavity. Responsive to the battery lock being in an unlocked position, the handle plunger is configured to cause the handle mount and the handle to pivot away from a face of the battery such that at least the portion of the handle mount engages the stationary latch of the battery lock.

18 Claims, 13 Drawing Sheets

(56) References Cited

U.S. PATENT DOCUMENTS

| | | | |
|---|---|---|---|
| 5,749,429 A | 5/1998 | Yamauchi et al. | |
| 5,789,898 A | 8/1998 | Suzuki et al. | |
| 5,798,702 A | 8/1998 | Okamoto et al. | |
| 5,829,546 A | 11/1998 | Tseng | |
| 6,012,538 A | 1/2000 | Sonobe et al. | |
| 6,276,479 B1 | 8/2001 | Suzuki et al. | |
| 6,920,953 B2 | 7/2005 | McGovern | |
| 7,150,339 B2 | 12/2006 | Liao et al. | |
| 7,243,937 B2 | 7/2007 | Ishikawa | |
| 7,320,251 B2 | 1/2008 | Harada et al. | |
| 7,342,321 B2 | 3/2008 | Kitamura | |
| 7,388,151 B2 | 6/2008 | Nishimoto | |
| 7,393,125 B1 | 7/2008 | Lai | |
| 7,547,021 B2 | 6/2009 | Bon | |
| 7,604,078 B2 | 10/2009 | Okamoto et al. | |
| 7,604,079 B2 | 10/2009 | Pittman | |
| 7,934,576 B2 | 5/2011 | Munksoe | |
| 8,789,640 B2 | 7/2014 | Matsuda | |
| 8,881,857 B2 | 11/2014 | Binggeli et al. | |
| 8,906,528 B2 | 12/2014 | Fujii et al. | |
| 8,979,110 B2 | 3/2015 | Talavasek et al. | |
| 8,979,111 B2 | 3/2015 | Dal Pozzo | |
| 9,132,878 B2 | 9/2015 | Matsuda | |
| 9,302,735 B2 | 4/2016 | Tagaya et al. | |
| 9,777,774 B2 | 10/2017 | Biechele | |
| 2004/0126652 A1 | 7/2004 | Meggiolan | |
| 2007/0017723 A1 | 1/2007 | Terada et al. | |
| 2008/0084046 A1 | 4/2008 | Yoshida et al. | |
| 2009/0082914 A1 | 3/2009 | Yuan | |
| 2009/0211828 A1 | 8/2009 | Bon | |
| 2009/0308678 A1 | 12/2009 | Chen | |
| 2010/0019676 A1 | 1/2010 | Yen | |
| 2013/0241169 A1* | 9/2013 | Talavasek | B62M 6/90 280/274 |
| 2014/0183839 A1 | 7/2014 | Massimo et al. | |
| 2015/0183489 A1 | 7/2015 | Talavasek et al. | |
| 2016/0167736 A1 | 6/2016 | Arbour | |
| 2016/0254506 A1 | 9/2016 | Taihei et al. | |
| 2018/0001785 A1 | 1/2018 | Shimoda et al. | |
| 2018/0006278 A1 | 1/2018 | Shimoda | |
| 2019/0009855 A1* | 1/2019 | Munkso | B62J 43/30 |
| 2019/0165347 A1* | 5/2019 | Trif | B62J 43/13 |
| 2019/0337588 A1* | 11/2019 | Wecker | B62K 19/40 |

FOREIGN PATENT DOCUMENTS

| | | |
|---|---|---|
| CN | 102420296 | 4/2012 |
| CN | 202268414 | 6/2012 |
| CN | 102642593 | 8/2012 |
| CN | 102700653 | 10/2012 |
| CN | 202464076 | 10/2012 |
| CN | 202608942 | 12/2012 |
| CN | 202624562 | 12/2012 |
| CN | 102897261 | 1/2013 |
| CN | 103121486 | 5/2013 |
| CN | 202923824 | 5/2013 |
| CN | 202923825 | 5/2013 |
| CN | 203020504 | 6/2013 |
| CN | 203064153 | 7/2013 |
| CN | 203071149 | 7/2013 |
| CN | 203358801 | 12/2013 |
| CN | 203553235 | 4/2014 |
| CN | 203652055 | 6/2014 |
| CN | 203681825 | 7/2014 |
| CN | 203832691 | 9/2014 |
| CN | 104118522 | 10/2014 |
| CN | 203921105 | 11/2014 |
| CN | 205365968 | 7/2016 |
| CN | 205737952 | 11/2016 |
| CN | 206327505 | 7/2017 |
| CN | 208882030 | 5/2019 |
| DE | 202016104142 | 9/2016 |
| DE | 202015103750 | 11/2016 |
| EP | 686551 | 1/1998 |
| EP | 686549 | 3/1998 |
| EP | 686550 | 8/1998 |
| EP | 686521 | 12/1998 |
| EP | 686522 | 12/1998 |
| EP | 716009 | 5/1999 |
| EP | 794113 | 6/2004 |
| EP | 1433697 | 3/2005 |
| EP | 1982909 | 12/2010 |
| JP | 10181651 | 7/1998 |
| JP | 11105759 | 4/1999 |
| JP | 2000238675 | 9/2000 |
| JP | 2005219728 | 8/2005 |
| JP | 2015140071 | 8/2015 |
| JP | 2016032999 | 3/2016 |
| KR | 101207885 | 12/2012 |
| KR | 20150006665 | 1/2015 |
| KR | 20160034711 | 3/2016 |
| WO | WO 2008/106976 | 9/2008 |

* cited by examiner

BICYCLE BATTERY ASSEMBLY

CROSS-REFERENCE TO RELATED APPLICATION

The present application claims the priority benefit of U.S. Provisional Patent Application No. 62/667,840 filed on May 7, 2018, the entire disclosure of which is incorporated herein by reference.

BACKGROUND

An electric bicycle (or e-bike) can refer to a bicycle that incorporates a power source that assists a rider with bicycle propulsion. Some e-bikes provide a pedal assist functionality that engages only when the rider is pedaling, making it easier for the rider to travel on the bicycle. Other e-bikes provide an on-demand power functionality in which the power source can propel the bicycle regardless of whether the rider is pedaling. Other e-bikes combine both the pedal-assist and the on-demand power functionalities to provide the rider with more options. The power source used in an e-bike can include one or more of a rechargeable battery, a supercapacitor, a motor, a belt drive system, etc.

SUMMARY

An illustrative bicycle battery system includes a battery assembly and a battery lock. The battery assembly includes a battery and a handle assembly mounted to the battery. The handle assembly includes a handle mount, a handle plunger, and a handle. The battery lock is mounted within a cavity of a frame of a bicycle and configured to secure the battery assembly within the cavity. The battery lock includes a lock plunger, a movable latch, and a stationary latch. The lock plunger is configured to press a portion of the handle mount against the movable latch when the battery lock is in a locked position such that the battery assembly is securely mounted within the cavity. Responsive to the battery lock being in an unlocked position, the handle plunger is configured to cause the handle mount and the handle to pivot away from a face of the battery such that at least the portion of the handle mount engages the stationary latch of the battery lock.

An illustrative method of forming a bicycle battery system includes mounting a handle assembly to a battery to form a battery assembly, where the handle assembly includes a handle mount, a handle plunger, and a handle. The method also includes mounting a battery lock within a cavity of a frame of a bicycle. The battery lock is configured to secure the battery assembly within the cavity. The battery lock includes a movable latch and a stationary latch. The method also includes mounting a lock plunger onto a base of the battery lock, where the lock plunger is configured to press a portion of the handle mount against the movable latch when the battery lock is in a locked position such that the battery assembly is securely mounted within the cavity. The method further includes mounting a handle plunger to a face of the battery. Responsive to the battery lock being in an unlocked position, the handle plunger is configured to cause the handle mount and the handle to pivot away from the face of the battery such that at least the portion of the handle mount engages the stationary latch of the battery lock.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Many traditional e-bikes include a battery or other power source that is mounted on a rack or bracket that is attached to an external surface of the bicycle frame. For example, some traditional e-bikes utilize a rack that is mounted behind the bicycle seat and above the rear tire, and that is configured to secure the power source for the e-bike. However, such a mounting configuration can result in a higher center of gravity for the e-bike, which results in a less stable ride.

Additionally, such placement of the power source takes up valuable space and limits the rider's ability to store gear, tools, etc. on the bicycle.

Described herein is an internal bicycle battery assembly that is incorporated into the frame of the bicycle. The internal bicycle battery assembly allows the battery to be removed by the user and saves space on the bicycle frame for the mounting of racks, water bottles, gear, etc. As discussed in more detail below, the proposed internal bicycle battery assembly also includes a two-stage locking feature to help prevent the battery from falling off of the e-bike and to help prevent the battery from being dropped when it is removed by a user.

Figure 1:
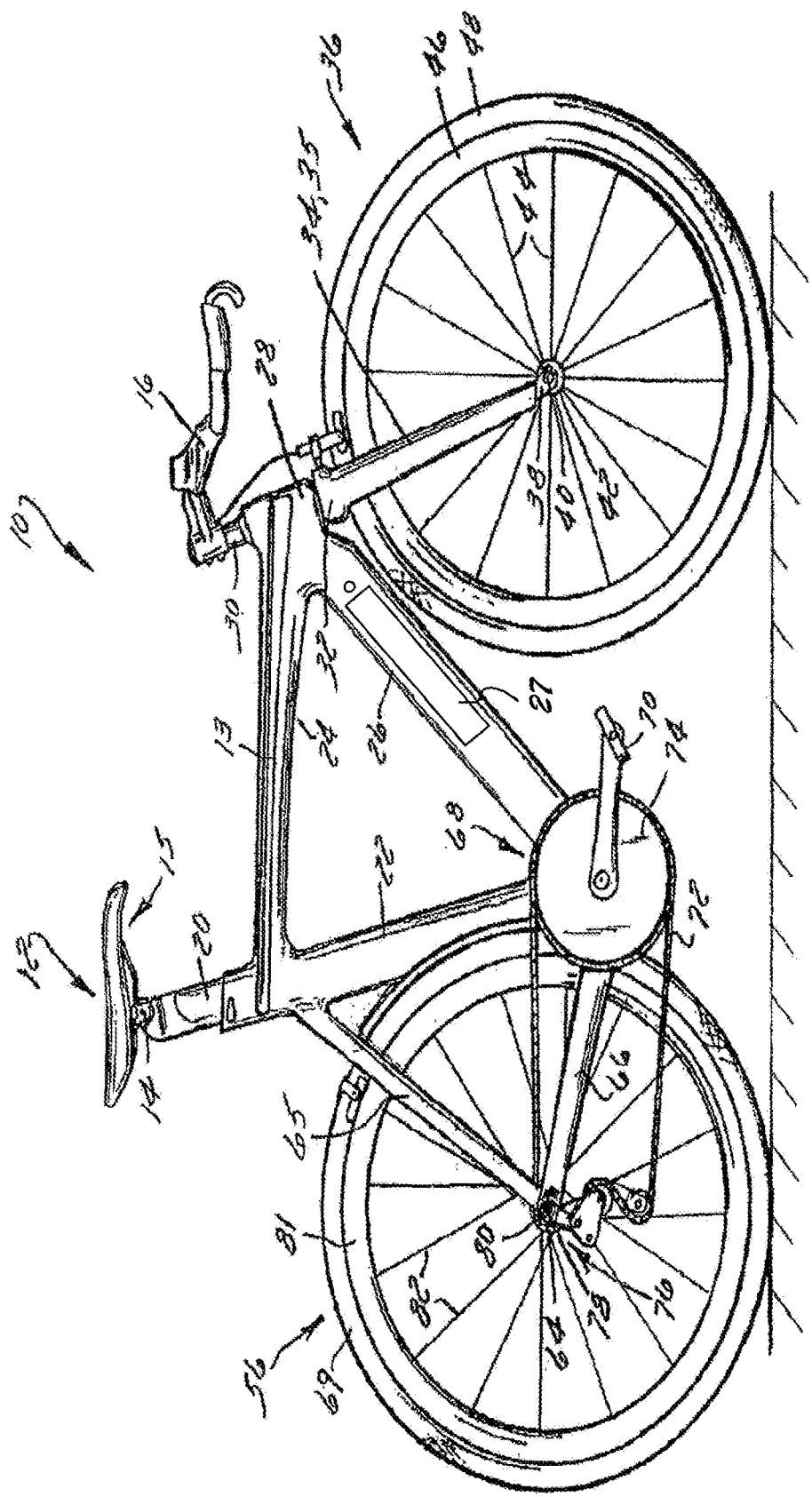
FIG. 1 shows a bicycle equipped with an internal bicycle battery assembly that is constructed in accordance with the illustrative embodiments described herein.

FIG. 1 shows a bicycle 10 equipped with an internal bicycle battery assembly 27 that is constructed in accordance with the embodiments described herein. The internal bicycle battery assembly 27 can be used to provide power to a motor (not shown) or other component(s) to assist with propulsion of the bicycle 10. The bicycle 10 also includes a frame 13 to which a seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13. As depicted in FIG. 1, the internal bicycle battery assembly 27 is incorporated into the down tube 26. In alternative embodiments, the internal bicycle battery assembly could be incorporated into the top tube 24 or the seat tube 22. Additionally, the internal bicycle battery assembly 27 is shown on a side of the down tube 26 in FIG. 1 for illustrative purposes. It is to be understood that the internal bicycle battery assembly 27 can alternatively be mounted to a top surface or a bottom surface of the down tube 26.

Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. Additionally, the internal bicycle battery assembly 27 supports a battery which provides pedal-assist and/or on-demand power functionalities. It is appreciated that bicycle 10 could be provided in either of a road bicycle, mountain bicycle, off-road bicycle, trail bicycle, etc. configuration. It is appreciated that each configuration includes features generally directed to the intended operating environment of the bicycle. For example, trail bicycles generally include more robust suspension and tire systems than road bicycles.

Figure 2:
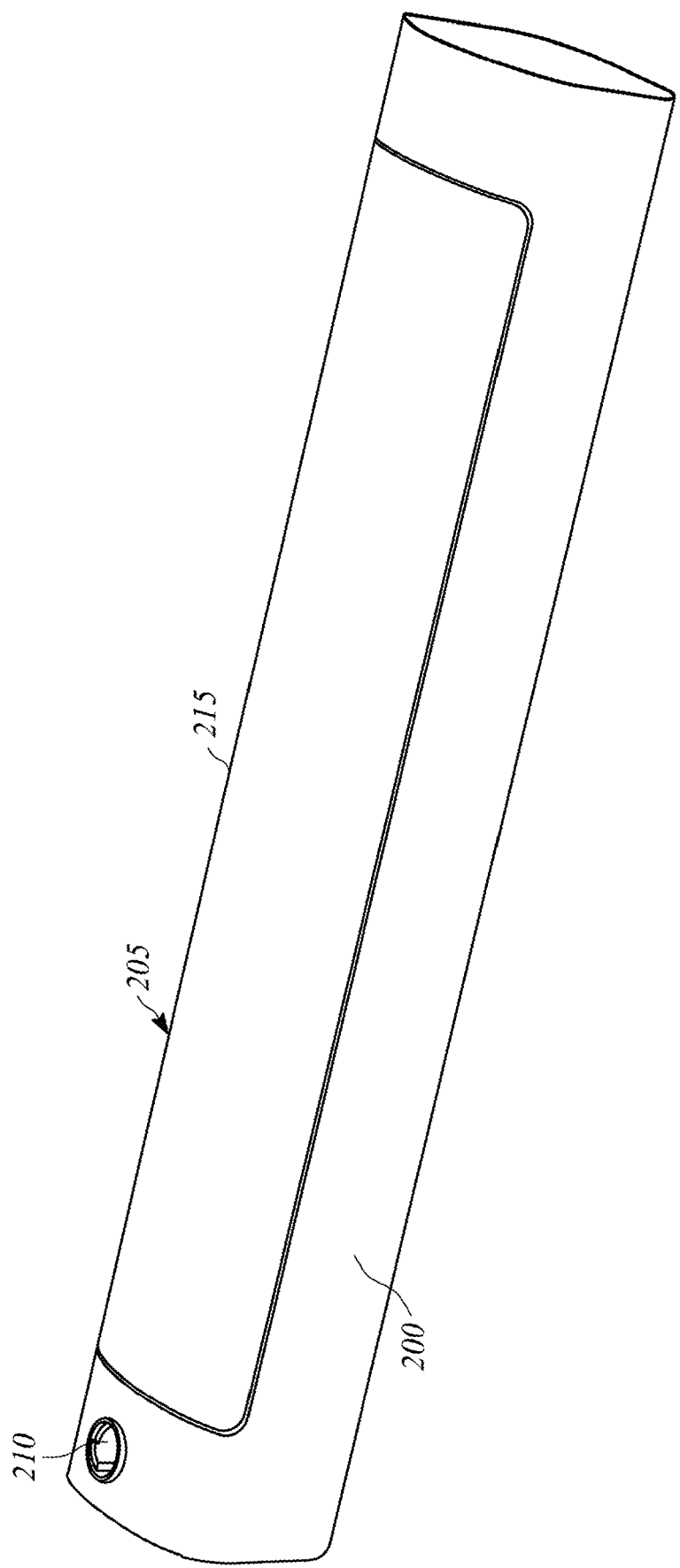
FIG. 2 depicts a portion of a down tube that includes an internal bicycle battery assembly (or battery assembly) in accordance with an illustrative embodiment.

FIG. 2 depicts a portion of a down tube 200 that includes an internal bicycle battery assembly (or battery assembly) 205 in accordance with an illustrative embodiment. As depicted, the internal bicycle battery assembly 205 is mounted on a top surface of the down tube 200. Alternatively, the battery assembly 205 may be mounted on a side or bottom of the down tube 200. In another alternative embodiment, the battery assembly 205 may be mounted to a different portion of the bicycle frame. A key receptacle 210 is also incorporated into the down tube 200. The key receptacle 210 is configured to receive a key that disengages a battery lock and allows a user to remove the battery assembly 205 for convenient battery charging and/or replacement. The battery lock is described in more detail below. In one embodiment, the key receptacle 210 can also be configured to receive a charging cord such that a battery of the battery assembly 205 can be charged while the battery assembly 205 is mounted to the down tube 200. Alternatively, a separate charging port may be included on the down tube 200 or the battery assembly 205.

A cover plate 215 forms an external surface of the battery assembly 205. In an illustrative embodiment, the cover plate 215 can be made from the same material as the down tube 205 and can have the same appearance (i.e., color, shape, gloss, graphics, etc.) as the down tube 205. Example materials can include carbon fiber, aluminum, plastic, and stainless steel. In alternative embodiments, the cover plate 215 may be made from a different material and/or have a different appearance relative to the down tube 200.

Figure 3:
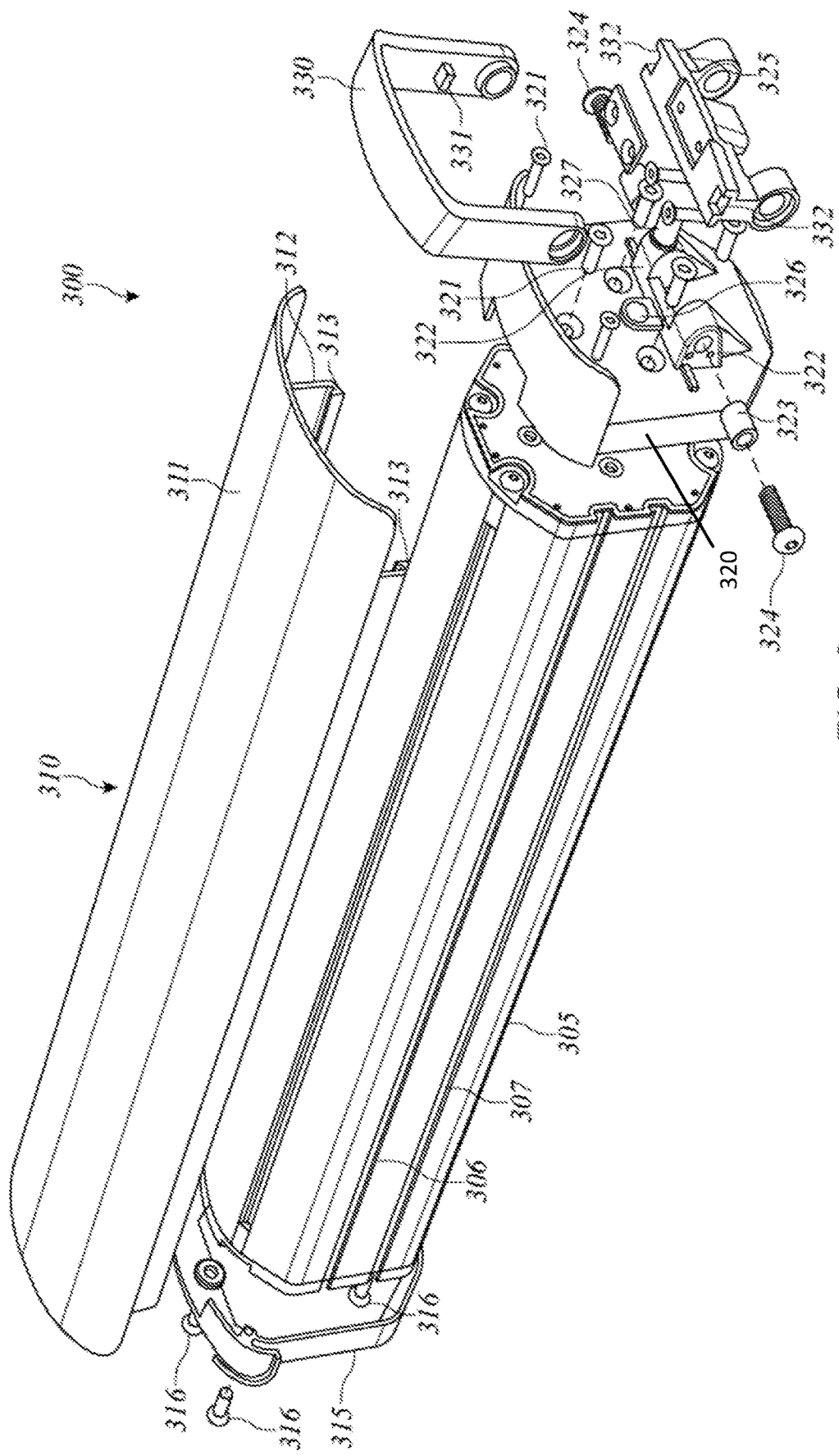
FIG. 3 is an exploded view of a battery assembly in accordance with an illustrative embodiment.

FIG. 3 is an exploded view of a battery assembly 300 in accordance with an illustrative embodiment. The battery assembly 300 includes a battery 305, a cover plate assembly 310, a battery outlet cover 315, a front battery cover 320, a handle mount 325, and a handle 330. In alternative embodiments, the battery assembly 300 may include fewer, additional, and/or different components. The battery 305 can be a lithium-ion battery or any other type of battery known in the art. In an illustrative embodiment, the battery 305 is used to provide power to one or more components that enable pedal assist and/or on-demand power for the bicycle. The one or more components that receive power from the battery 305 can include one or more hub motors or any other type of electric motor(s) known in the art. The battery 305 can be connected to the one or more hub motors, etc. using wiring as known in the art.

The cover plate assembly 310 is used to help secure and protect the battery 305 within a cavity of the down tube or other portion of the bicycle frame in which the battery assembly 300 is positioned. The cover plate assembly 310 includes a cover plate 311 and a side cover 312 for the battery 305. In an illustrative embodiment, the cover plate 311 and the side cover 312 are integrally formed into a single component. Alternatively, the cover plate 311 and the side cover 312 can be distinct components which may be connected to one another via adhesive, fasteners, etc. In another alternative embodiment, the cover plate 311 and the side cover 312 can be distinct components which are independently mounted.

Figure 4:
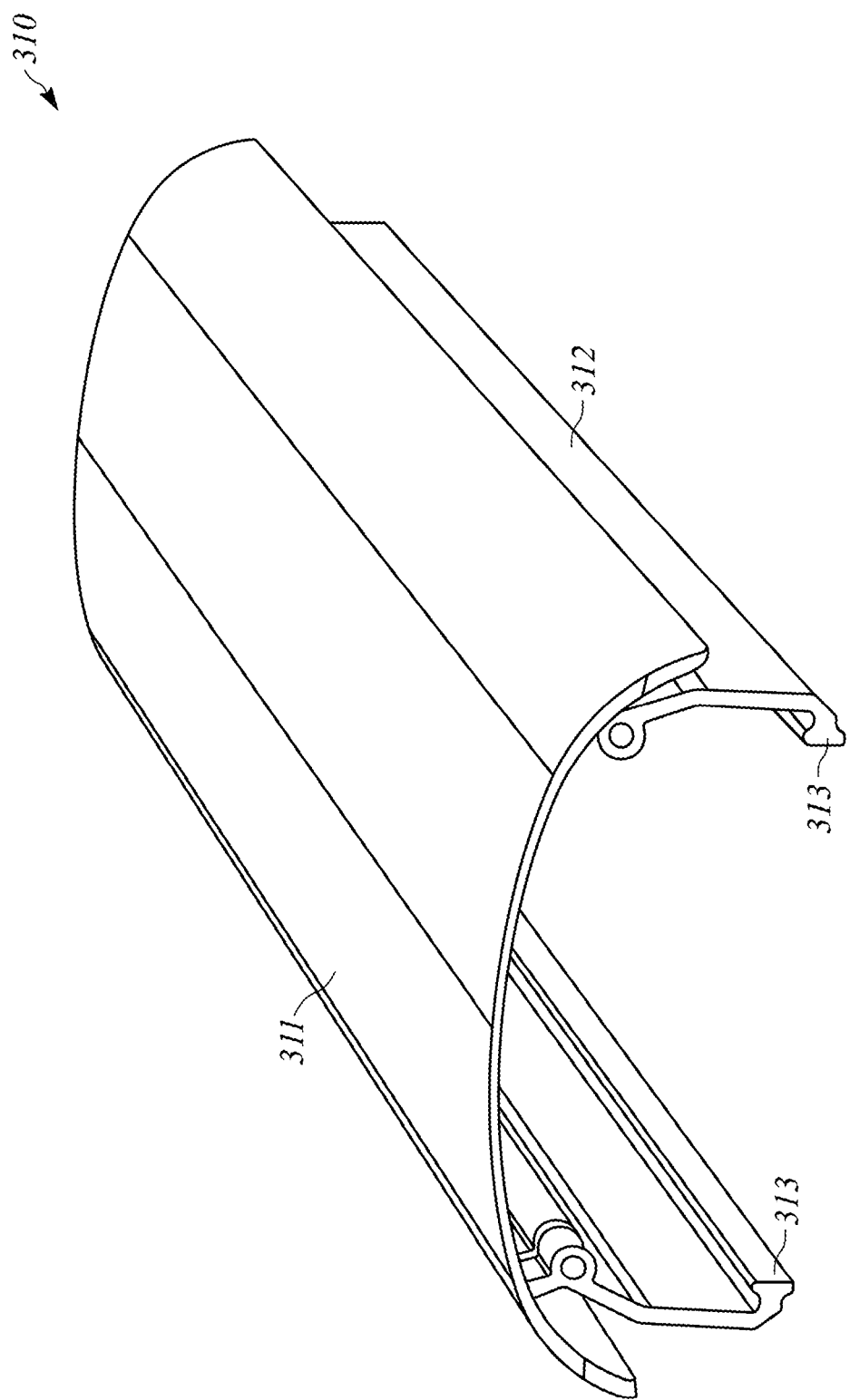
FIG. 4 is a perspective view of a cover plate assembly in accordance with an illustrative embodiment.

As discussed above, the cover plate 311 can be made from the same material as the bicycle frame and can have the same appearance as the frame. The side cover 312 includes tracks 313 that are designed to fit within respective grooves on each side of a housing of the battery 305. As depicted in FIG. 3, each side of the battery housing includes a first groove 306 and a second groove 307 such that the battery 305 includes two pairs of grooves. In alternative embodiments, a single pair of grooves may be used. In another illustrative embodiment, the tracks 313 of the side cover 312 are designed to fit within the first groove 306 (or the second groove 307) on each side of the battery 305 such that the cover plate assembly 310 is secured to the battery 305, which in turn is secured to the bicycle frame as discussed below. In addition to (or as an alternative to) the track and groove mating, the cover plate assembly 310 can also be attached to the battery 305 using fasteners, an adhesive, etc. FIG. 4 is a perspective view of the cover plate assembly 310 in accordance with an illustrative embodiment.

Referring again to FIG. 3, the battery outlet cover 315 is used to secure a rear portion of the battery 305 (i.e., the portion of the battery 305 closest to a rear tire of the bicycle) to the bicycle frame. The battery outlet cover 315 is mounted to the battery 305 using fasteners 316, which can be screws, bolts, etc. Any number of the fasteners 316 may be used. In an alternative embodiment, the battery outlet cover 315 may be secured to the battery 305 by an adhesive or other method.

Figure 5:
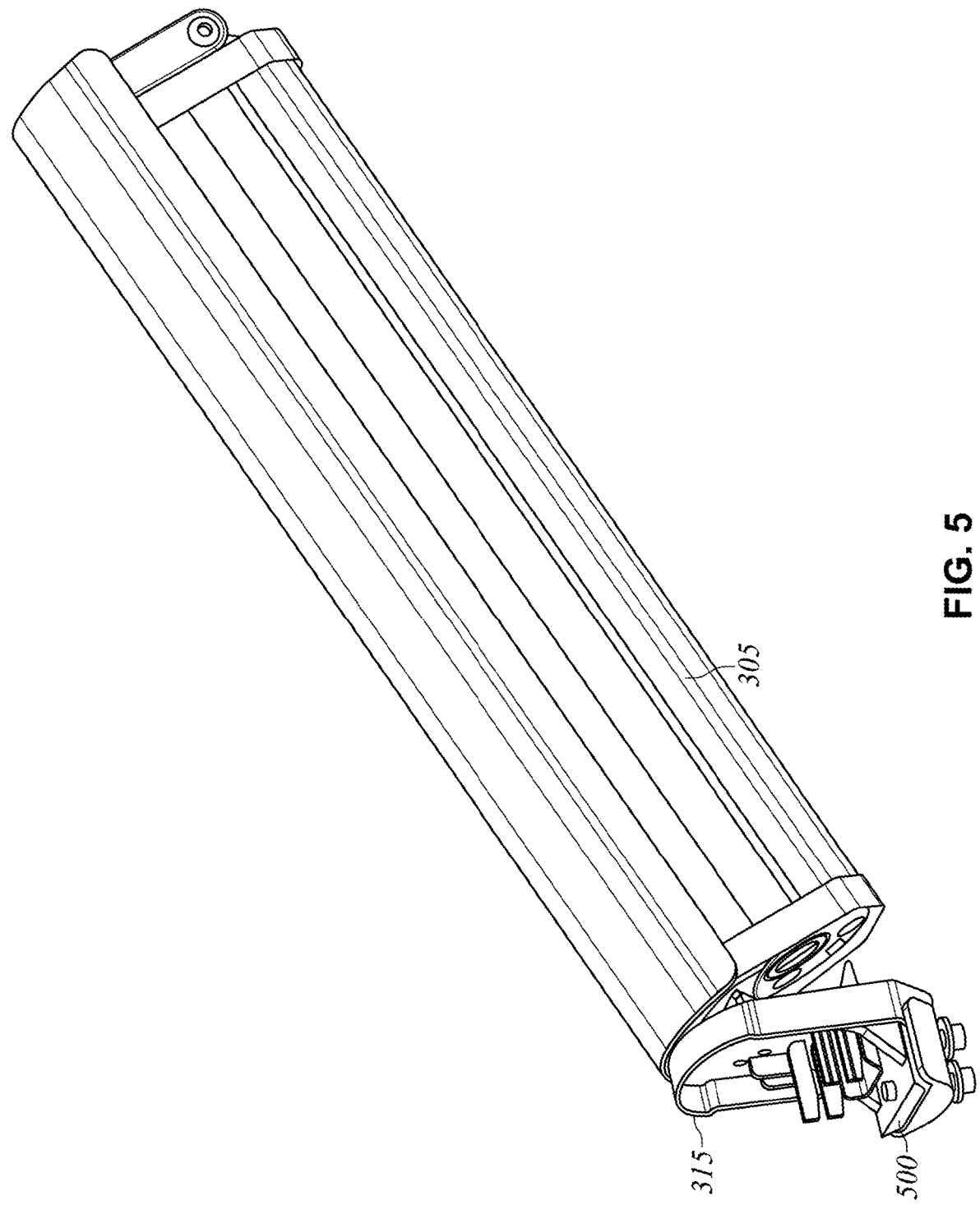
FIG. 5 depicts a battery outlet cover attached to an outlet cover mounting bracket in accordance with an illustrative embodiment.

In an illustrative embodiment, the battery outlet cover 315 is secured to the bicycle frame by way of an outlet cover mounting bracket. FIG. 5 depicts the battery outlet cover 315 attached to an outlet cover mounting bracket 500 in accordance with an illustrative embodiment. The outlet cover mounting bracket 500 can be secured within the cavity of the down tube or other frame component in which the battery assembly is mounted. The outlet cover mounting bracket 500 can be secured to the frame using one or more fasteners, an adhesive, solder/weld, etc. depending on the frame material. Electrical wires (not shown) that connect the battery 305 to one or more motors can run through the battery outlet cover 315 and can be connected to the battery terminals as known in the art. In an illustrative embodiment, the battery outlet cover 315 detaches from the outlet cover mounting bracket 500 upon removal of the battery assembly 300 from the bicycle. Removal of the battery assembly is depicted and described with reference to FIGS. 9-14.

Referring back to FIG. 3, the front battery cover 320 is mounted to a front portion of the battery 305 (i.e., a portion of the battery 305 positioned closest to the front wheel of the bicycle) to help protect the battery 305 and to provide a mount for the handle 330. In the embodiment of FIG. 3, the front battery cover 320 is mounted to the battery 305 using fasteners 321. In alternative embodiments, the front battery cover 320 may be mounted to the battery 305 using an adhesive, solder, weld, or other method. The front battery cover 320 includes mounting pedestals 322 that are used to secure the handle mount 325 to which the handle 330 is mounted. Specifically, the mounting pedestals 322 on the front battery cover 320 include openings that are configured to receive bushings 323 and fasteners 324 such that the handle mount 325 is pivotally mounted to the front battery cover 320.

The handle 330 for the battery assembly 300 is mounted to the handle mount 325 via the same fasteners 324 used to secure the handle mount 325 to the front battery cover 320. Additionally, the handle 330 includes protrusions 331 which are configured to mate with indentations 332 on the handle mount 325. As a result, the handle 330 is secured to the handle mount 325 and is unable to pivot independent of the handle mount 325. The front battery cover 320 also includes an opening 326 that is configured to receive a spring-loaded handle plunger 327, which is described in more detail below.

In an illustrative embodiment, the battery 305 can include an opening that aligns with the opening 326 such that the handle plunger 327 is at least partially recessed within the battery 305.

Figure 6:
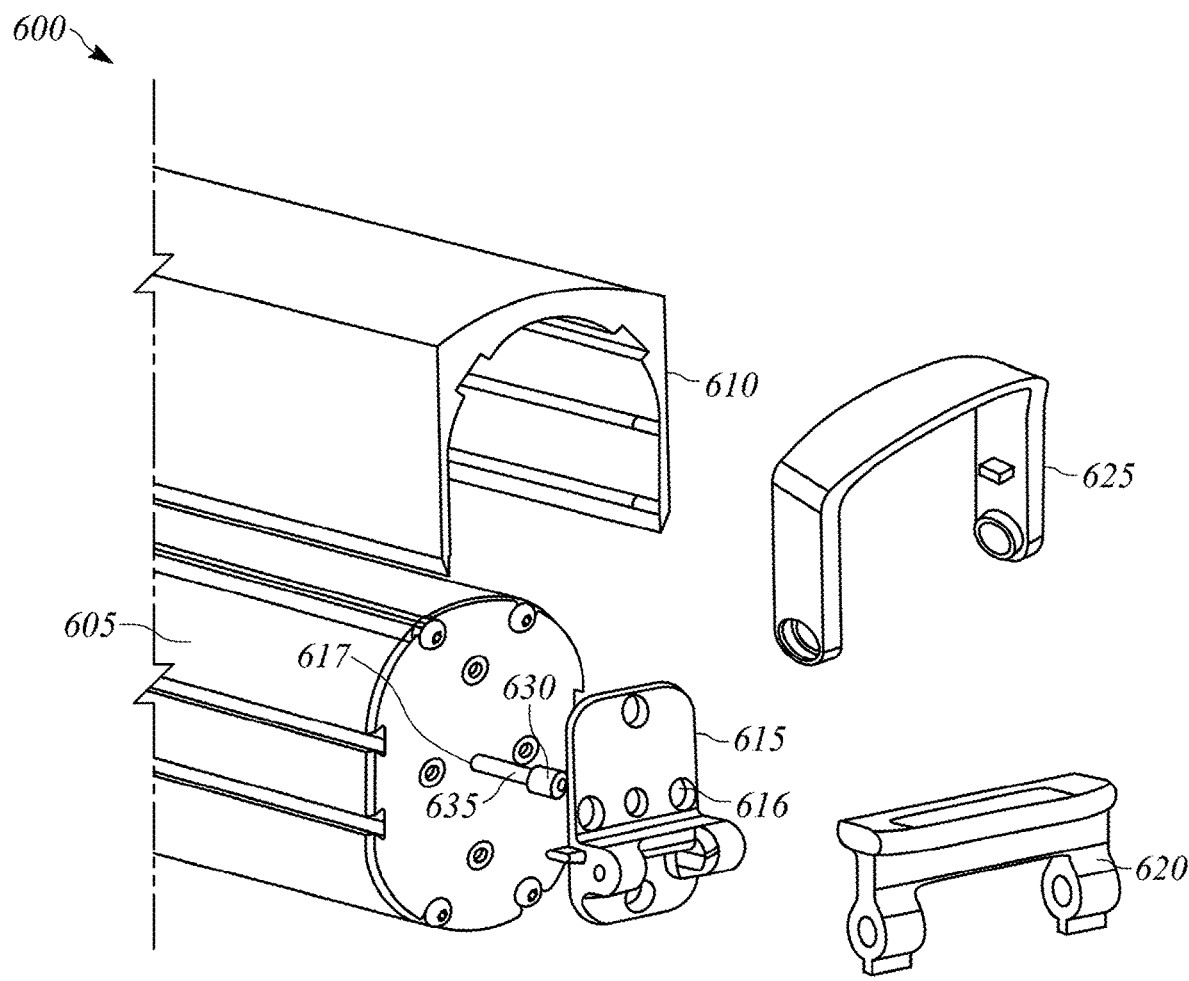
FIG. 6 is a partial exploded view of a front portion of a battery assembly in accordance with an illustrative embodiment.

FIG. 6 is a partial exploded view of the front portion of a battery assembly 600 in accordance with an illustrative embodiment. The battery assembly 600 includes a battery 605, a cover plate assembly 610, a front battery cover 615, a handle mount 620, and a handle 625. The front battery cover 615 includes an opening 616 that is aligned with an opening 617 in the battery 605. The openings 616 and 617 are configured to receive a handle plunger 630 and a spring 635 such that the handle plunger 630 is spring-loaded. As discussed in more detail below, when a battery lock for the battery assembly 600 is in a locked position, the handle mount 620 is pressed against the front battery cover 615, causing the spring 635 to compress such that the handle plunger 630 is in a spring-loaded position. Upon release of the battery lock, the spring 635 at least partially decompresses, causing the handle plunger 630 to push the handle mount 620 and the handle 625 mounted thereto away from the front face of the battery 605.

Figure 7:
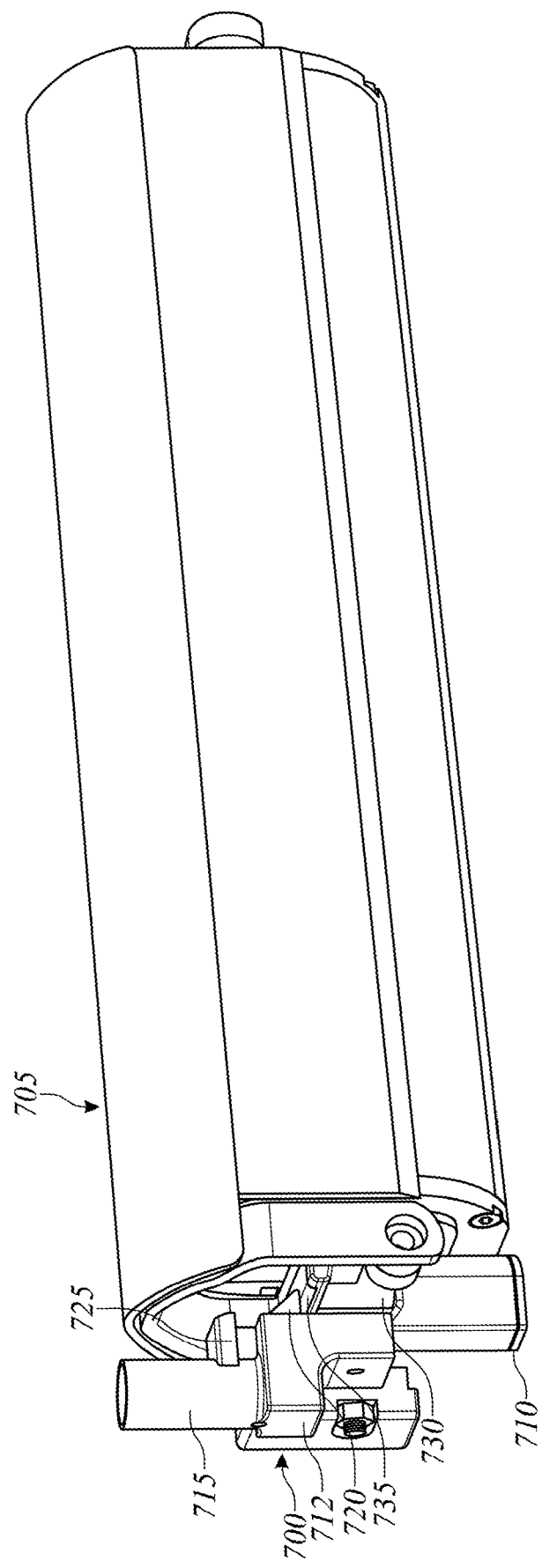
FIG. 7 depicts a battery lock engaged with a battery assembly in accordance with an illustrative embodiment.
Figure 8:
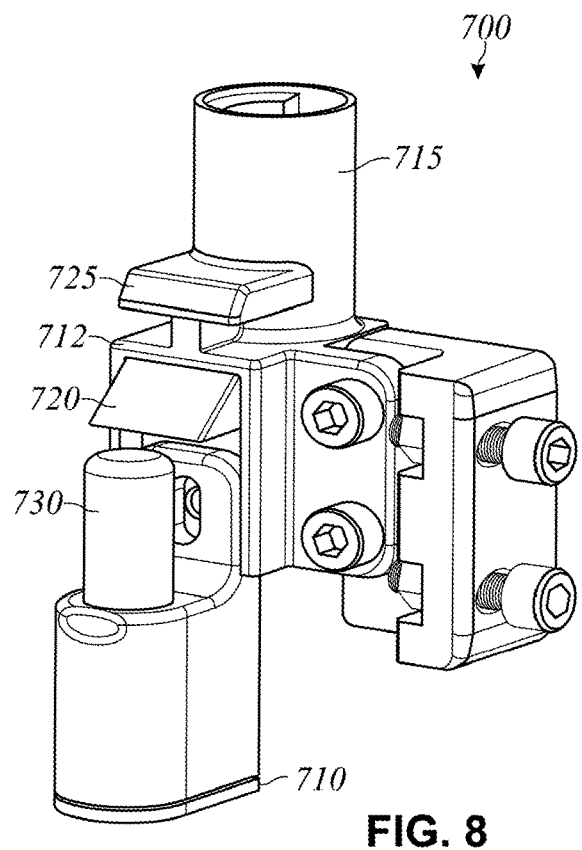
FIG. 8 is a perspective view of the battery lock of FIG. 7 in accordance with an illustrative embodiment.

FIG. 7 depicts a battery lock 700 engaged with a battery assembly 705 in accordance with an illustrative embodiment. FIG. 8 is a perspective view of the battery lock 700 in accordance with an illustrative embodiment. The battery lock 700 includes a base 710, a body 712, a key receptacle 715, a movable latch 720, and a stationary latch 725. The base 710 is mounted within the cavity of the bicycle frame that houses the battery assembly 705, and is used to mount the battery lock 700 to the frame. The base 710 can be mounted to the frame using solder, a weld, an adhesive, and/or one or more fasteners. The base 710 also includes an opening that houses a spring-loaded lock plunger 730. As depicted in FIG. 7, the battery lock 700 is in a locked position and a spring of the lock plunger 730 is compressed. As a result, the lock plunger 730 presses against a bottom side of a handle mount 735 such that the handle mount 735 is positioned between the lock plunger 730 and the movable latch 720. The handle mount 735 can be the same as or similar to the handle mounts 325 and 620 depicted in FIGS. 3 and 6, respectively.

In an illustrative embodiment, the key receptacle 715 is configured to receive a physical key which can be used to disengage the movable latch 720. In an alternative embodiment, the key receptacle 715 can be configured to receive an electronic signal from a user device that causes the movable latch 720 to disengage. When the movable latch 720 is disengaged via a key, signal, etc., the movable latch 720 is drawn into the body 712 of the battery lock 700. As a result, the lock plunger 730 causes the battery assembly 705 to move outward from the cavity in which it is housed. Additionally, the handle plunger 327 depicted in FIG. 3 (or the handle plunger 630 depicted in FIG. 6) pushes on the handle mount 735 and causes it to pivot away from the front face of the battery such that the handle mount 735 engages the stationary latch 725. This two-stage locking mechanism prevents the battery assembly 705 from completely disengaging upon activation of the key, which helps prevent the battery assembly from ejecting off of the bicycle frame and falling to the ground upon key activation.

Figure 9:
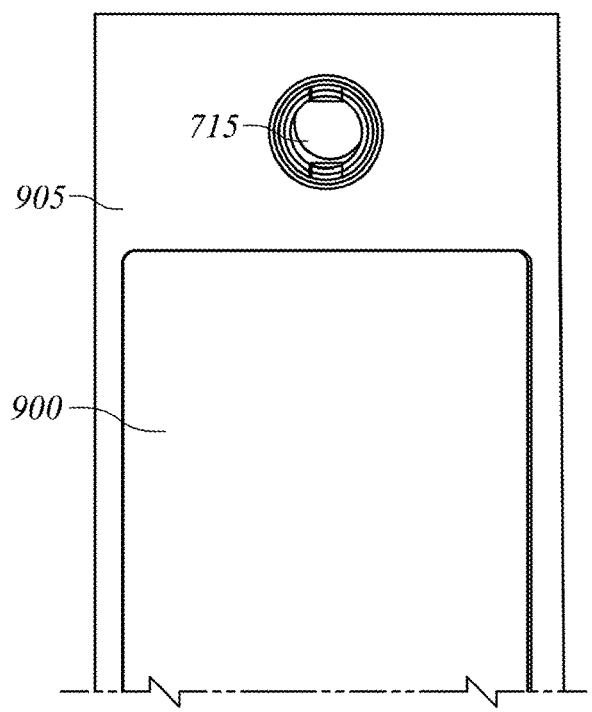
FIG. 9 is a partial exterior view of a battery assembly in a locked position in accordance with an illustrative embodiment.

The two-stage locking mechanism for the battery assembly 705 is described in more detail with reference to FIGS. 9-14. FIG. 9 is a partial exterior view of the battery assembly 705 in a locked position in accordance with an illustrative embodiment. Visible in FIG. 9 is a cover plate assembly 900 of the battery assembly 705 that is flush with an exterior surface of a component 905 of a bicycle frame. The component 905 of the bicycle frame can be a down tube or any other frame component. The battery assembly 705 is secured within a cavity of the component 905 of the bicycle frame as depicted and described herein. Also depicted in FIG. 9 is the key receptacle 715 for the battery lock 700.

Figure 10:
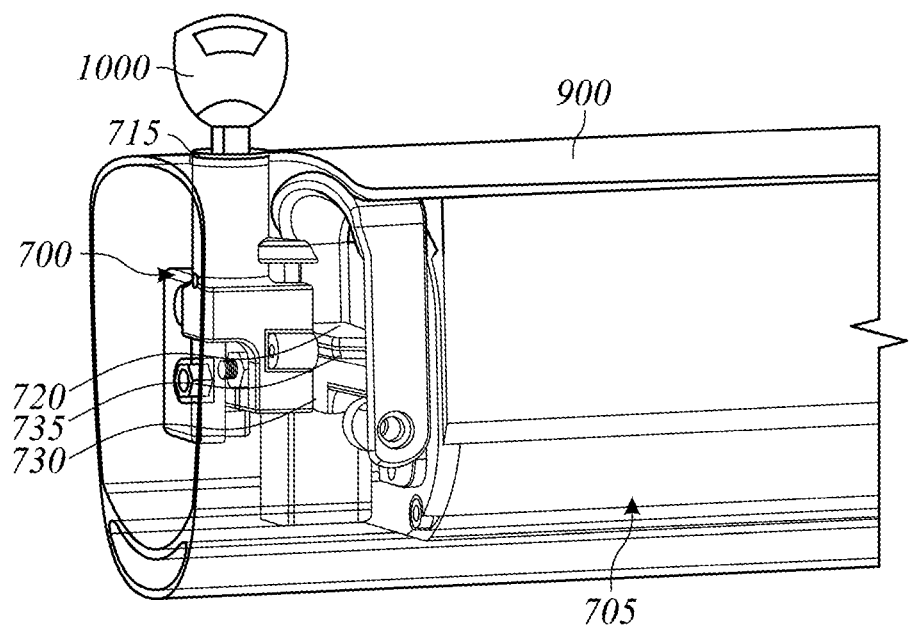
FIG. 10 is a partial interior side view of the battery lock in a locked position in accordance with an illustrative embodiment.

FIG. 10 is a partial interior side view of the battery lock 700 in a locked position in accordance with an illustrative embodiment. The lock plunger 730 presses against the handle mount 735 and secures the handle mount 735 between the lock plunger 730 and the movable latch 720. A key 1000 is shown inserted into the key receptacle 715 in FIG. 10. The key 1000 has not been activated (e.g., turned) and the movable latch 720 is depicted in the engaged (or locked) position. In an alternative embodiment, the key receptacle can be positioned and/or oriented in a different position on the frame. The key receptacle can also be positioned in a different location relative to the battery assembly.

Figure 11:
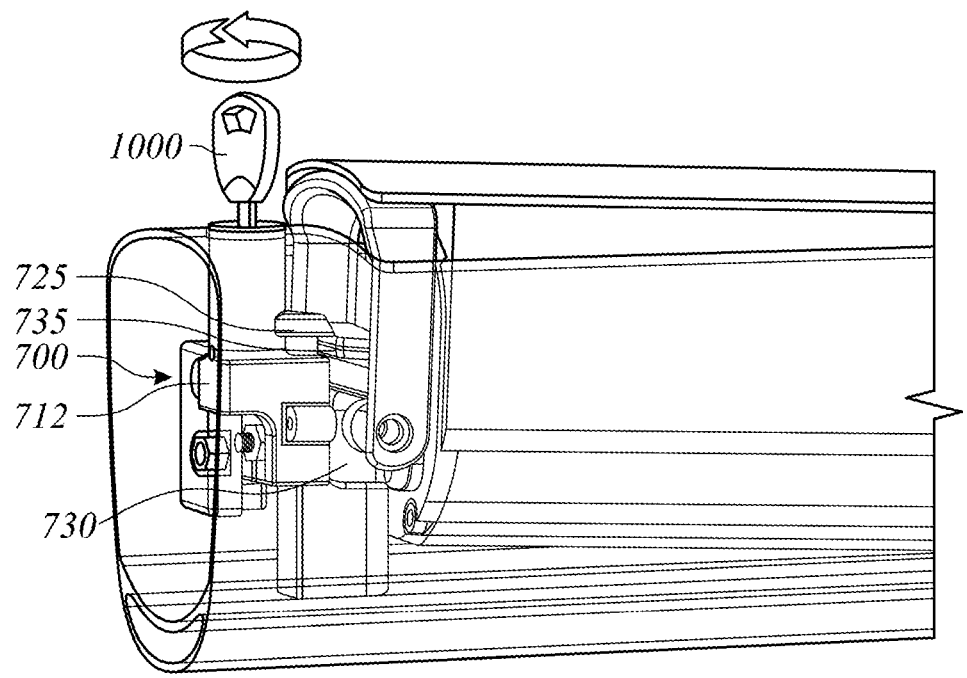
FIG. 11 is a partial interior side view of the battery lock in an unlocked position in accordance with an illustrative embodiment.

FIG. 11 is a partial interior side view of the battery lock 700 in an unlocked position in accordance with an illustrative embodiment. In the embodiment of FIG. 11, the key 1000 has been activated by a user, thereby causing the movable latch 720 to be withdrawn into the body 712 of the battery lock 700. As a result, the lock plunger 730 causes the battery assembly to move partially out of the cavity in which it is mounted. Additionally, the handle plunger 327 depicted in FIG. 3 (or the handle plunger 630 depicted in FIG. 6) pushes on the handle mount 735 and causes the handle mount 735 to pivot away from the front face of the battery such that the handle mount 735 engages the stationary latch 725. The battery assembly is therefore partially disengaged from the bicycle frame, but is unable to be ejected and fall to the ground because of the stationary latch 725. More specifically, forces from the lock plunger 730 and the handle plunger 327 (or the handle plunger 630) cause the handle mount 735 to engage the stationary latch 725 once the user activates the key to the battery lock 700.

Figure 12:
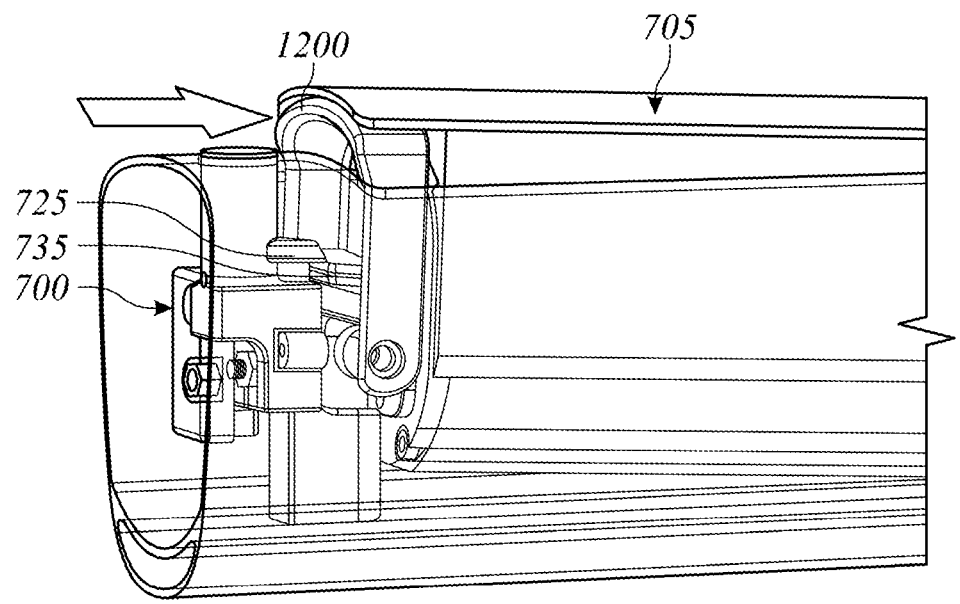
FIG. 12 is a partial interior side view of the battery assembly being disengaged from the battery lock in accordance with an illustrative embodiment.
Figure 13:
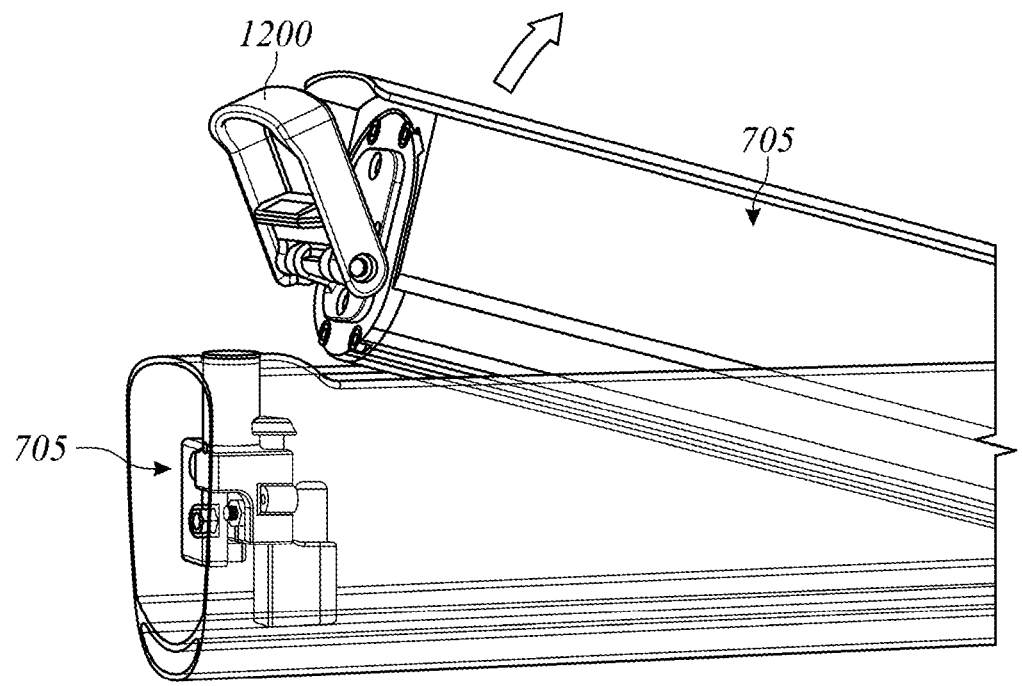
FIG. 13 depicts removal of the battery assembly from the cavity in the bicycle frame in accordance with an illustrative embodiment.
Figure 14:
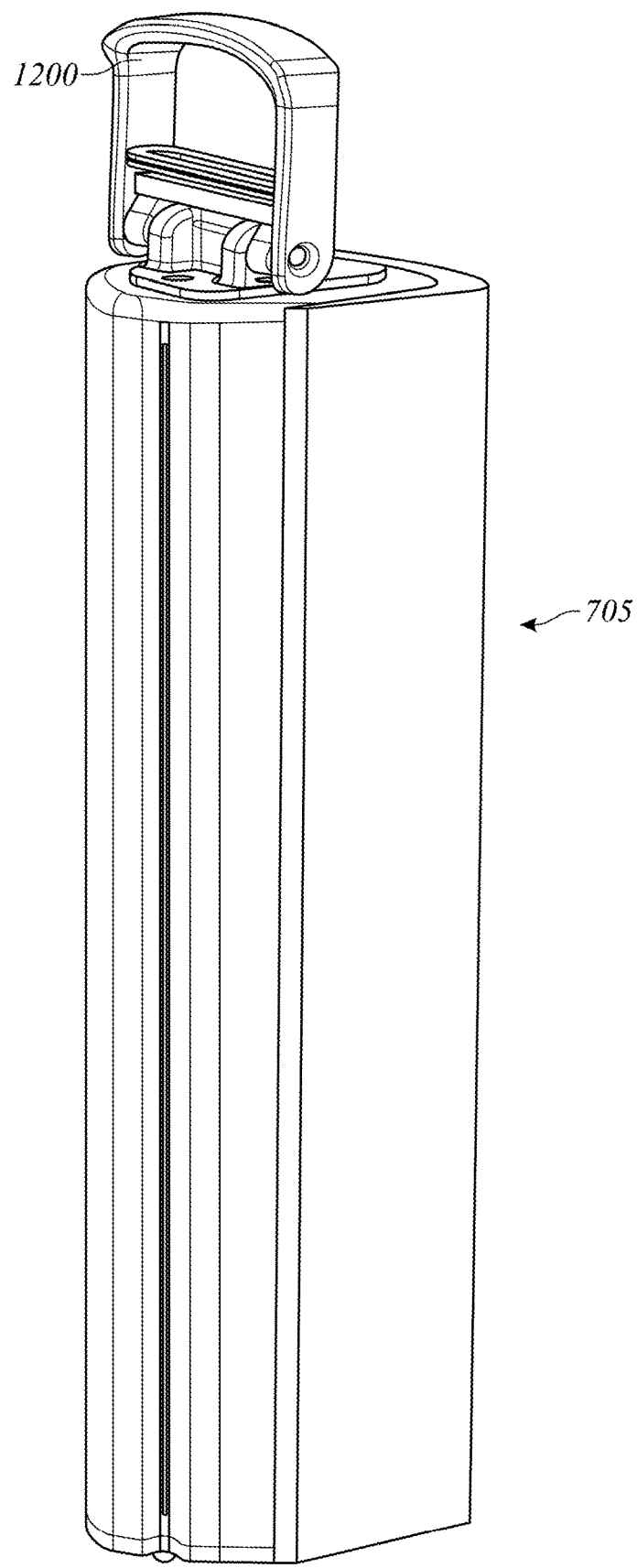
FIG. 14 depicts the handle in a carry position in accordance with an illustrative embodiment.

FIG. 12 is a partial interior side view of the battery assembly 705 being disengaged from the battery lock 700 in accordance with an illustrative embodiment. To disengage the battery assembly 705, a user presses a handle 1200 of the battery assembly 705 toward the front face of the battery, which causes the handle plunger 327 depicted in FIG. 3 (or the handle plunger 630 depicted in FIG. 6) to be compressed. As a result, the handle mount 735, which is mounted to the handle 1200, disengages from the stationary latch 725 such that the battery assembly 705 can be removed from the cavity in the bicycle frame. FIG. 13 depicts removal of the battery assembly 705 from the cavity in the bicycle frame in accordance with an illustrative embodiment. FIG. 14 depicts the handle 1200 in a carry position in accordance with an illustrative embodiment. The handle 1200 allows a user to easily carry the battery assembly to a secure location for storage and/or charging.

Figure 15A:
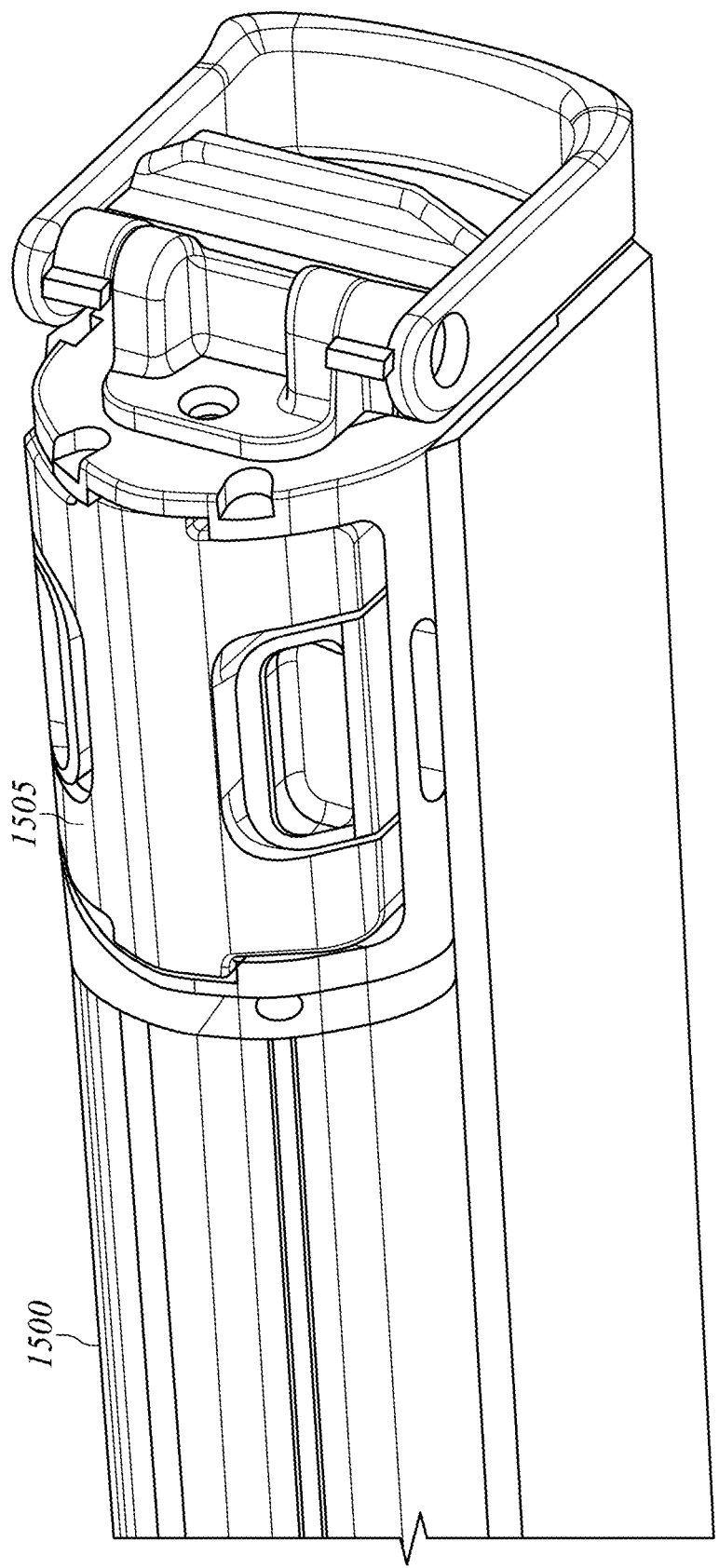
FIG. 15A depicts a battery assembly that includes a storage compartment in accordance with an illustrative embodiment.
Figure 15B:
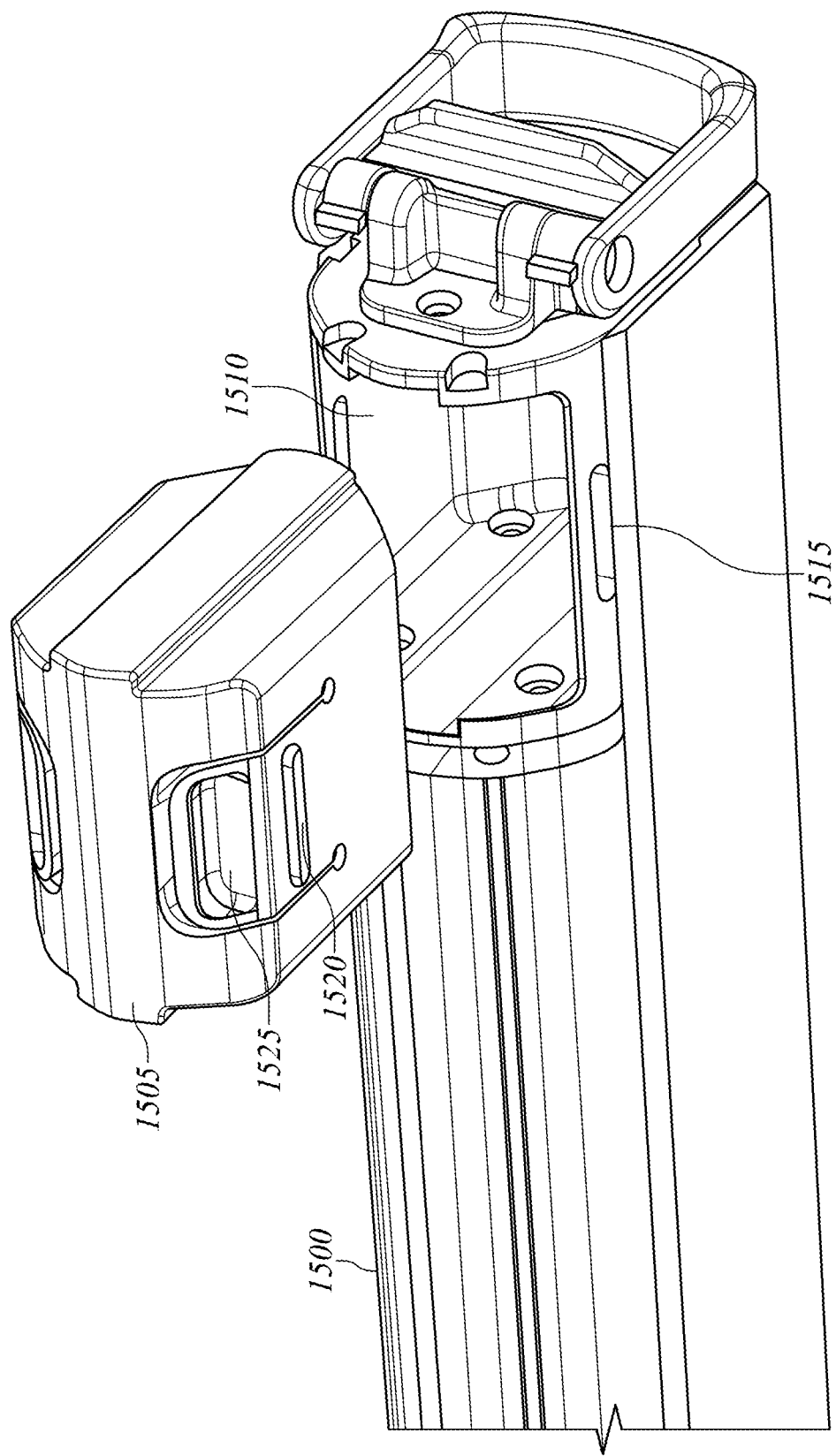
FIG. 15B depicts the storage compartment removed from the battery assembly in accordance with an illustrative embodiment.

FIG. 15A depicts a battery assembly 1500 that includes a storage compartment 1505 in accordance with an illustrative embodiment. FIG. 15B depicts the storage compartment 1505 removed from the battery assembly 1500 in accordance with an illustrative embodiment. The storage compartment 1505 can be used to store a charging cable for the battery assembly 1500, a spare inner tube, one or more bicycle tools, personal items, etc. In an illustrative embodiment, the storage compartment 1505 is fitted within a chamber 1510 formed into the battery assembly. The chamber 1510 is depicted as being adjacent to an end of the battery assembly 1500 that includes the handle such that the storage compartment 1505 does not interfere with the wiring or electrical connections of the battery. Alternatively, the chamber 1510 may be positioned elsewhere within the battery assembly.

The chamber 1510 includes a slot 1515 that is configured to receive a protrusion 1520 on the storage compartment 1505 such that the storage compartment 1505 is securely mounted to the battery assembly 1500. To remove the storage compartment 1505, a user can depress a tab 1525 to disengage the protrusion 1520 from the slot 1515. In alternative embodiments, any other mounting techniques may be used to removably mount the storage compartment 1505 to the battery assembly 1500. In another alternative embodiment, the storage compartment 1505 may be permanently mounted within the battery assembly 1500 such that it is not removable from the battery assembly 1500.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A bicycle battery system, comprising:
   a battery assembly that includes a battery and a handle assembly mounted to the battery, wherein the handle assembly includes a handle mount that includes one or more indentations, a handle plunger, and a handle that includes one or more protrusions sized to mate with the one or more indentations of the handle mount such that the handle pivots in unison with the handle mount; and
   a battery lock mounted within a cavity of a frame of a bicycle and configured to secure the battery assembly within the cavity, wherein the battery lock includes a lock plunger, a movable latch, and a stationary latch;
   wherein the lock plunger is configured to press a portion of the handle mount against the movable latch when the battery lock is in a locked position such that the battery assembly is securely mounted within the cavity; and
   wherein, responsive to the battery lock being in an unlocked position, the handle plunger is configured to press against the handle mount and the handle such that the handle mount and the handle pivot away from a face of the battery such that at least the portion of the handle mount engages the stationary latch of the battery lock.

2. The bicycle battery system of claim 1, wherein the handle plunger is spring-loaded, and wherein at least a portion of the handle plunger is positioned within an opening on the face of the battery.

3. The bicycle battery system of claim 1, wherein the lock plunger is spring-loaded, and wherein at least a portion of the lock plunger is positioned within a base of the battery lock.

4. The bicycle battery system of claim 1, further comprising a battery cover mounted to the face of the battery, wherein the battery cover includes one or more mounting pedestals.

5. The bicycle battery system of claim 4, wherein the handle mount is pivotally mounted to the battery cover via the one or more mounting pedestals.

6. The bicycle battery system of claim 1, wherein responsive to a pivotal movement of the handle toward the face of the battery when the battery lock is in the unlocked position, the battery mount is configured to disengage from the stationary latch such that the battery assembly can be removed from the cavity.

7. The bicycle battery system of claim 1, wherein, responsive to the battery lock being in the unlocked position, the lock plunger is configured to cause the battery assembly to partially eject from the cavity such that at least the portion of the handle mount engages the stationary latch of the battery lock.

8. The bicycle battery system of claim 1, wherein the battery lock further includes a key receptacle, and wherein activation of a key within the key receptacle causes the battery lock to transition from the locked position to the unlocked position.

9. The bicycle battery system of claim 8, wherein the key receptacle is mounted such that the key receptacle is accessible through the frame of the bicycle.

10. The bicycle battery system of claim 1, wherein the battery assembly further comprises a cover plate assembly that includes a cover plate and side covers.

11. The bicycle battery system of claim 10, wherein each of the side covers includes a track that is configured to mate with a respective groove on a side of the battery to mount the cover plate assembly to the battery.

12. The bicycle battery system of claim 10, wherein the cover plate is made from a material that is used to fabricate the frame of the bicycle such that the cover plate matches an appearance of the frame of the bicycle.

13. A method of forming a bicycle battery system, comprising:
mounting a handle assembly to a battery to form a battery assembly, wherein the handle assembly includes a handle mount that includes one or more indentations, a handle plunger, and a handle that includes one or more protrusions sized to mate with the one or more indentations of the handle mount such that the handle pivots in unison with the handle mount;
mounting a battery lock within a cavity of a frame of a bicycle, wherein the battery lock is configured to secure the battery assembly within the cavity, and wherein the battery lock includes a movable latch and a stationary latch;
mounting a lock plunger onto a base of the battery lock, wherein the lock plunger is configured to press a portion of the handle mount against the movable latch when the battery lock is in a locked position such that the battery assembly is securely mounted within the cavity; and
mounting the handle plunger to a face of the battery, wherein, responsive to the battery lock being in an unlocked position, the handle plunger is configured to press against the handle mount and the handle such that the handle mount and the handle pivot away from the face of the battery such that at least the portion of the handle mount engages the stationary latch of the battery lock.

14. The method of claim 13, further comprising mounting a battery cover to the face of the battery, wherein the handle assembly is mounted to the battery cover.

15. The method of claim 14, further comprising mounting the handle plunger partially within an opening in the battery cover on the face of the battery.

16. The method of claim 15, further comprising mounting the handle plunger partially within an opening in the battery, wherein the opening in the battery is aligned with the opening in the battery cover.

17. The method of claim 14, wherein mounting the handle assembly includes mounting the handle mount to one or more mounting pedestals on the battery cover such that the handle mount pivots relative to the face of the battery.

18. The method of claim 13, further comprising mounting a key receptacle of the battery lock within the cavity such that the key receptacle is accessible through the frame of the bicycle.

* * * * *